United States Patent [19]
Stoltz

[11] Patent Number: 5,231,388
[45] Date of Patent: Jul. 27, 1993

[54] COLOR DISPLAY SYSTEM USING SPATIAL LIGHT MODULATORS

[75] Inventor: Richard A. Stoltz, Plano, Tex.

[73] Assignee: Texas Instruments Incorporated, Dallas, Tex.

[21] Appl. No.: 809,362

[22] Filed: Dec. 17, 1991

[51] Int. Cl.⁵ .............................................. G09G 3/34
[52] U.S. Cl. .................................. 340/783; 340/701; 340/752
[58] Field of Search .............................. 340/701-703, 340/783, 752; 353/31; 358/62, 89

[56] References Cited

U.S. PATENT DOCUMENTS

| | | | |
|---|---|---|---|
| 3,512,866 | 5/1970 | Griffiths et al. | 340/783 X |
| 4,087,810 | 5/1978 | Hung et al. | 340/783 X |
| 4,571,603 | 2/1986 | Hornbeck et al. | 340/783 X |
| 4,638,309 | 1/1987 | Ott | 340/783 X |

*Primary Examiner*—Ulysses Weldon
*Attorney, Agent, or Firm*—Julie L. Reed; James C. Kesterson; Richard L. Donaldson

[57] ABSTRACT

A color display system for transforming pixel data, where each of three primary colors is represented by a value for its intensity, into an image. Three light sources, 11a-11c, one for each primary color, each illuminate a spatial light modulator (SLM) 12a -12c, such as a deformable mirror device. Each of these SLMs 12a-12c is operated so that it reflects an amount of light corresponding to the intensity of the pixel currently being displayed. The light thus regulated is linearized into a single beam of mixed-color light using mirrors 14a, 14b, and lens 15, and directed to an addressing SLM 13. Addressing SLM 13 is operated so that only an element corresponding to the pixel being displayed is "on". The addressing SLM 13 reflects the mixed-color light for that pixel to a photosensitive surface 18.

21 Claims, 4 Drawing Sheets

COLOR DISPLAY SYSTEM USING SPATIAL LIGHT MODULATORS

RELATED PATENT APPLICATIONS

The following patent applications are related to the present application, and are incorporated by reference herein:

U.S. Ser. No. 678,761, "DMD Architecture and Timing for Use in a Pulse-Width Modulated Display System"

U.S. Ser. No. 756,007, "DMD Display System Controller"

U.S. Ser. No. 755,981, "Data Formatter with Orthogonal Input, Output, and Spatial Reordering"

U.S. Ser. No. 756,026, "Partitioned Frame Memory for Spatial Light Modulator"

U.S. Ser. No. 590,405, "Spatial Light Modulator with Full Complex Light Modulation Capability"

TECHNICAL FIELD OF THE INVENTION

This invention relates to color display systems, and more particularly to using spatial light modulators to control the intensity light of from different colored light sources, with the colored light then being mixed such that the mixed light is reflected by a pixel-addressing spatial light modulator to a display screen.

BACKGROUND OF THE INVENTION

Spatial light modulators (SLMs) are devices used to control the distribution of light in an optical system. SLMs are typically configured as one or two-dimensional arrays of individually addressable optical elements, representing pixels of an image. These elements modify either the amplitude or the phase of the light distribution within the optical system.

SLMs can be divided into various types, including electro-optic, magneto-optic, liquid crystal, and deformable mirror devices. These different types may be further characterized according to whether they are suitable for amplitude or phase modulation or both.

SLMs have proved to be useful in many types of applications. Many applications involve their use in display systems, where a SLM optical- system replaces a raster scan system. Other applications include optical information processing, and electrostatic printing. SLMs and their applications are described in the patents and patent applications listed in the "Related Patents" section above, which are all assigned to the same assignee as the present invention. The background sections of those references, which are incorporated by reference herein, contain extensive discussions of SLM display systems, and especially those using spatial light modulators.

For generating grey scale images, existing SLM systems use various modulation techniques are used, such as by controlling the time during which the pixels are on or off. For producing color, separate light sources for different colors, typically red, blue, and green, are used to illuminate the SLM. For each frame, all pixels of the SLM array are addressed at once and the illumination for the SLM cycles through three colors. To produce variations in 256 color, various techniques are used, such as by modulating the length of time that each pixel element is on.

Another approach to providing color is to vary the intensity of the light sources. However, a problem with this approach is that variable sources, such as tunable lasers, are expensive. Also, if color is to be adjusted at the source, some means must exists for ensuring that the correct color reaches the correct pixel, such as by individually addressing each pixel as its color is produced. However, this increases the time required to display a complete image. In order to provide a complete image within the time constraints of the human eye to integrate separate pixels, the time for switching between colors must be very fast.

Because of the wide variety of applications of SLM display systems, a need exists for alternative methods of producing color so that each system may use the technique best suited for it.

SUMMARY OF THE INVENTION

One aspect of the invention is a color display system for displaying an image from an incoming data signal comprised of data representing the image in terms of pixels, where each pixel has color data representing an intensity of each of three primary colors. The display system has a set of light sources, one for each primary color. The light from these sources is directed to a set of color-regulating SLMs, such that each color-regulating SLM receives light from one of the sources. Each color-regulating SLM has an array of pixel elements that may all be switched on or off simultaneously according to a desired intensity of color. The light from each color-regulating SLM is linearized along a path toward an addressing SLM, and in the preferred embodiment is combined into a single beam of mixed color light toward the addressed SLM. The addressing SLM receives the linearized light beam and reflects light to a photosensitive surface. The addressing SLM has an array of individually addressable pixel elements, so that only one or more pixels associated with the color produced by the color regulating SLMs is reflected toward the photosensitive surface.

A technical advantage of the invention is that it provides an alternative to SLM modulation techniques for producing color images. Instead of adjusting for the color of each pixel at the master SLM, additional SLMs are used in conjunction with a source of each color to adjust color.

The correctly colored light may be delivered to each pixel in a single beam, thus there is no need to orient phosphors on the display screen or otherwise accommodate for a series of three primary colors.

The invention permits the use of conventional light sources. This results in a less expensive system than one that uses lasers, especially when the lasers must be varied in intensity. Also, the time for switching between colors is within the time range required for addressing and loading a simple SLM; i.e., in the range of 10–20 microseconds. This may permit real time operation, provided that the pixels for an entire image can be addressed within the constraints for integration by the human eye.

DETAILED DESCRIPTION OF THE INVENTION

Figure 1:
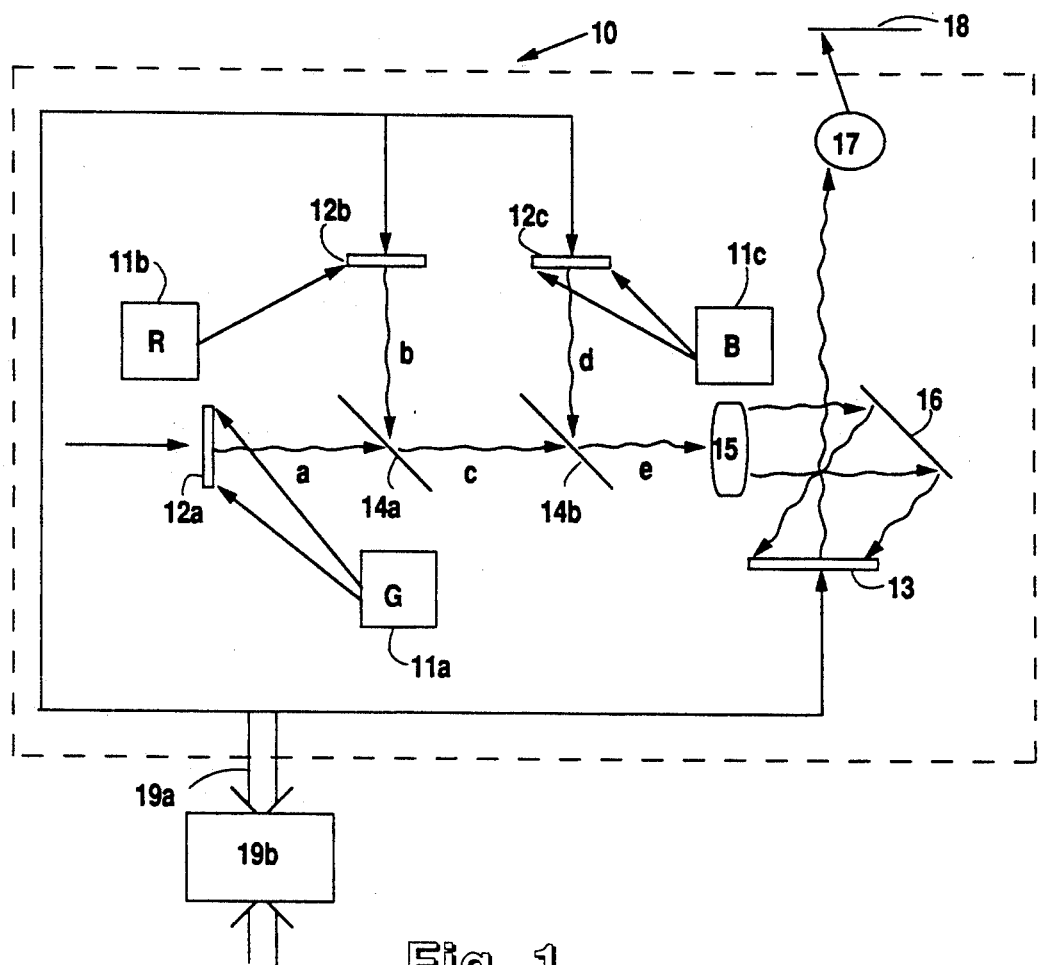
FIG. 1 illustrates an optics unit for a digital display system that uses SLMs in accordance with the invention.

FIG. 1 illustrates an optics unit 10 for a digital image display system. Optics unit 10 uses spatial light modulators (SLMs) for two different functions. Color-regulating SLMs 12a-12c adjust the color intensities from colored light sources 11a-11c. The light thus adjusted is received by an addressing SLM 13, whose individual mirror elements are turned on or off to generate a pixel image on a display screen 18. Thus, for each pixel to be displayed, SLMs 12a-12c receive data representing its color, and SLM 13 receives data representing its location on a photosensitive surface 18, such as a display screen. The structure and operation of optics unit 10 will be further explained in detail, but first an example of a display system with which optics unit 10 may be used is described, as well as an example of a SLM device.

The description herein is in terms of implementing SLMs 12a-12c and 13 with deformable mirror devices (DMDs). However, the invention is not limited to the use of DMDs for SLMs 12a-12b and may be implemented with other types of SLMs. A common characteristic of a suitable SLM device is the ability to reflect light from pixel elements that are individually addressable.

Figure 2:
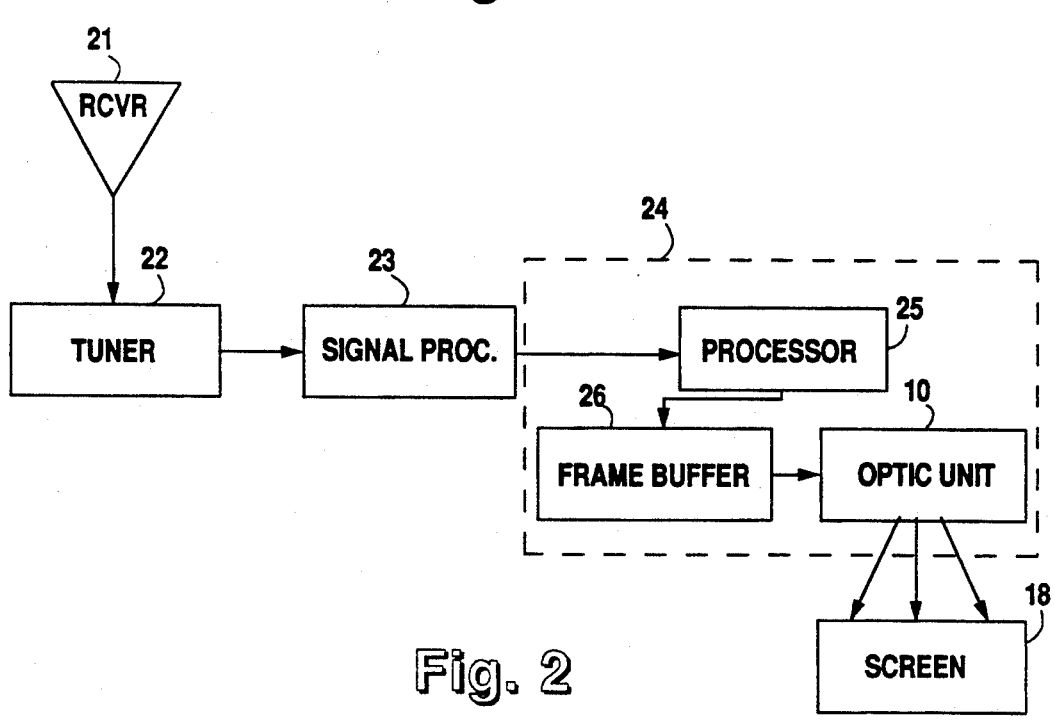
FIG. 2 illustrates a television display system to includes the optics unit of FIG. 1.

FIG. 2 illustrates a television display system that includes optics unit 10. Another type of video display application that could include optics unit 10 is a computer display. In both of these applications, photosensitive surface 18 is a display screen. Other image-generating applications may be implemented using the same concepts. For example, rather than receiving a video signal for display on a screen, the system of FIG. 2 could be part of a printer system or any other system in which an incoming signal representing image data is to be received and operated on. Also, photosensitive surface 18 could be a sensor device that generates electronic signals for further transmission or for storage. Photosensitive surface 18 could also be a film such as for recording a still picture.

For the television display system, receiver 21 receives a television signal of some standardized format and passes it to tuner 22, which splits the signal into an audio and a video component. The audio portion of the signal will not be considered further herein. Tuner 22 passes the signal to a signal processor 23 for analog-to-digital conversion and other enhancements. The enhanced digital signal is then sent to projection system 24, which contains image control processor 25, frame buffer 26, and optics unit 10. Image control processor 25 converts the signal to a form suitable for storage in frame buffer 26. Frame buffer 26 delivers data, row-by-row, in bit-frames to optics unit 10. As will be explained below, optics unit 10 receives light from internal light sources, and generates an image for display to a viewer.

For purposes of example herein, the incoming display data is assumed to be an National Television Standards Committee (NTSC) signal, having samples for 480 rows and 640 columns of pixels. Each pixel is represented by 24 bits of data. This data represents red-blue-green data, where each color is represented by 8 bits.

An example of a processor 25 for providing data samples is described in U.S. patent Ser. No. 678,761, "DMD Architecture and Timing for Use in a Pulse-Width Modulated Display System". Other applications may use other types of processors, however, a common characteristic is the providing of digital data for frame buffer 26. Processor 25 reformats incoming data so that it may be read into frame buffer 26 in a manner that permits bit-frames to be read out from frame buffer 26.

Frame buffer 26 is comprised of video random access memory (VRAM) devices. These VRAM devices solve the problem of access to a high resolution frame buffer by including an internal parallel-in/serial-out shift register that can be accessed independently from the rest of the memory unit. In one memory cycle, an entire row of pixel data is transferred from memory to the shift register. During read-out from the shift register, the memory is free to be read into.

An example of a VRAM device is the TMS4161 integrated circuit, manufactured by Texas Instruments, Inc. The shift register is as wide as the memory array and can be parallel loaded by asserting a transfer signal while a row of memory is being read. The serial register has its own data clock, enabling it to transfer data out of the chip at high speeds. Other VRAM type devices may be used, with the essential characteristic being a configuration similar to a RAM, but with a parallel-in/serial-out data register connected to a second data port. Where standard commercially available VRAM devices are used, the size and number of VRAM devices needed are determined by factors such as the size of the pixel array and the required parallel data output.

For increasing operating speed, frame buffer 26 may be partitioned into more than one part. The details and advantages of this partitioning are discussed in U.S. patent Ser. No 756,026, "Partitioned Frame Memory for Spatial Light Modulator". That patent application also describes the various control signals used to drive frame buffer 26. For purposes of example herein, it is assumed that frame buffer 26 is partitioned into an upper and a lower part. Other partitioning configurations could be used without changing the concepts described herein.

For a 640×480 pixel image, the upper part of frame buffer 26 receives the upper 240 rows of video data, and the lower part of frame buffer 26 receives the lower 240 rows. Video data is stored into the upper and lower parts of frame buffer 26 one line at a time. Thus, only one of the upper or lower parts of frame buffer 26 is loaded at any given time.

Figure 3:
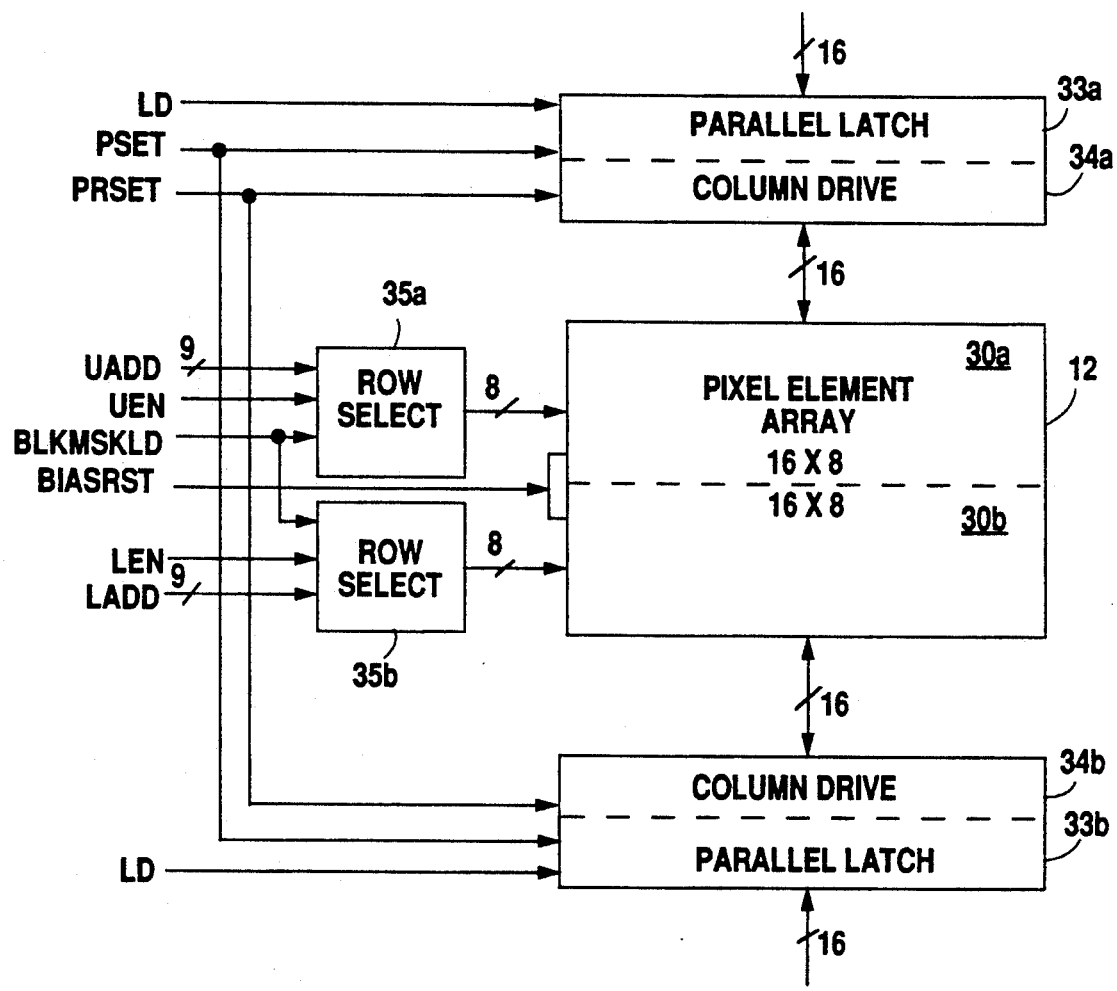
FIG. 3 illustrates a an example of a DMD, together with circuitry for loading a frame of pixel elements.

FIG. 3 illustrates a deformable mirror device (DMD) 12, such as may be used for SLMs 12a-12c. As explained in the background of this patent application, DMDs are a type of SLM having an array of mirror elements corresponding to pixels of an image. Each mirror element is electronically addressable and capable of separate mechanical movement in response to an electrical input. For display, the DMD is illuminated by a light source, and each mirror element is switched to either an on or an off position. If a mirror element is on, it reflects the light to a projection image; otherwise no light is reflected to the image.

An example is the DMD device manufactured by Texas Instruments Incorporated, in which each pixel element is associated with a memory cell having 2 bits of data storage and may be individually addressed. Other DMD devices may be used, and are characterized by various types of architectures. The mirror elements may be moveable by means of torsion-beam or cantilever supports, or may be elastomer or membrane designs. Addressing may be achieved by an e-beam input, optically, or by integrated circuits. Various types of DMD devices are described in the references cited in the background section of this patent application.

The description herein is in terms of implementing SLMs 12a–12c and 13 with deformable mirror devices (DMDs). However, the invention is not limited to the use of DMDs for SLMs 12a–12b, and may be implemented with other types of SLMs. A common characteristic of a suitable SLM device is the ability to reflect light from pixel elements that are individually addressable.

In the example of this description, DMD 12 is a 256 pixel array, having 16 rows and 16 columns. This permits $2^8$, or 256 levels of intensity to be displayed for each color.

DMD 12 is divided into an upper part 30a and lower part 30b. Although data is loaded into the upper and lower parts of frame buffer 26 at different times, output data from frame buffer 26 is loaded into DMD 12 simultaneously into upper part 30a and lower part 30b. In the example of this description, the output from frame buffer 26 is delivered to DMD 12 in two sets of 16 lines, each line carrying one bit. One set of data lines is loaded to upper part 30a and the other set to lower part 30b, simultaneously.

DMD 12 receives this into parallel latches 33a and 33b. Parallel latches 33a and 33b are controlled by common load, set, and reset signals (LD, PSET, and PRESET). Column drivers 34a and 34b drive 1 bit of row data to each column of pixel element arrays 30a and 30b. Upper array 30a and lower array 30b are each in communication with a row selector 35a and 35b. Row selectors 35a and 35b are simple decoders, which each receive 9 bits of address data (UADD and LADD), which represent one of 240 rows to be filled.

To fill all pixel elements of mirror array 30 of DMD 12, requires 1 clock cycle per row × 8 rows. Once all pixel memories of both upper and lower mirror arrays 30a and 30b have been loaded, the states of the pixels change according to the stored data, simultaneously, in response to a reset signal (BIASRST).

The function and size of SLM 13 is different from that of SLMs 12a–12c. SLM 13 is larger and its pixel elements are turned on one at a time. In the example of this description, SLM 13 is a 640×480 DMD pixel array to match the rows and columns of the sampled incoming data. However, the concepts described herein could be implemented with any size array, with appropriate changes being made to the data inputs described herein.

An important consideration for real-time operation of the invention is the ability of the human eye to integrate pixel elements and to avoid a perception of flicker as pixel elements switch on and off. Where photosensitive surface 18 is a display screen, projecting the image to a screen whose pixel elements have a mixture of grains of three color phosphors will help reduce flicker. Ideally, the address and switch period for each pixel element of SLM 13 is minimized so that an entire frame can be displayed in a period that is short enough to provide a viewer with a coherent image. Thus, if 8 clock cycles are required to load SLMs 12a–12c, each new pixel element of SLM 13 should be addressed and switched at least as frequently. In the preferred embodiment, instead of being loaded as an entire array line-by-line using the scheme of FIG. 3, SLM 13 is loaded by addressing individual pixel elements. By "real-time" is meant that the generation of a moving image on photosensitive surface 18 is accomplished at substantially the same rate as receipt of the incoming pixel data, with whatever delays are caused by the practical constraints of electronic circuitry. To enhance real-time operation, processor 25 may include a means for determining which pixels of a frame are of the same color, so that for each frame, this color is adjusted once by color-regulating SLMs 12a–12c, while all pixels of that color are switched on addressing SLM 13.

As the resolution of SLM 13 increases, to provide a satisfactory image, without annoying flicker, various embodiments of the invention may use more than one system of light sources 11a–11c and color-regulating SLMs 12a–12c. For example, with two sets of light sources and color-regulating SLMs, two paths of light could be directed to SLM 13. Two pixels could be addressed and displayed at one time, thus, the image would be displayed twice as fast. In applications, where a real-time image is not required, such as a camera for still pictures, the image frame time is not as important.

For example, if it takes $20\times10^{-6}$ seconds to load and switch SLMs 12a–12c, it would take $20\times10^{-6}\times640\times480$ to display an entire screen with SLM 13. This is 6.14 seconds per frame. The eye needs at least 5 frames per second (0.2 seconds per frame). Thus, 32 sets (or eight sets that are four times faster) could be used for real time or near real time applications.

Figure 4A:
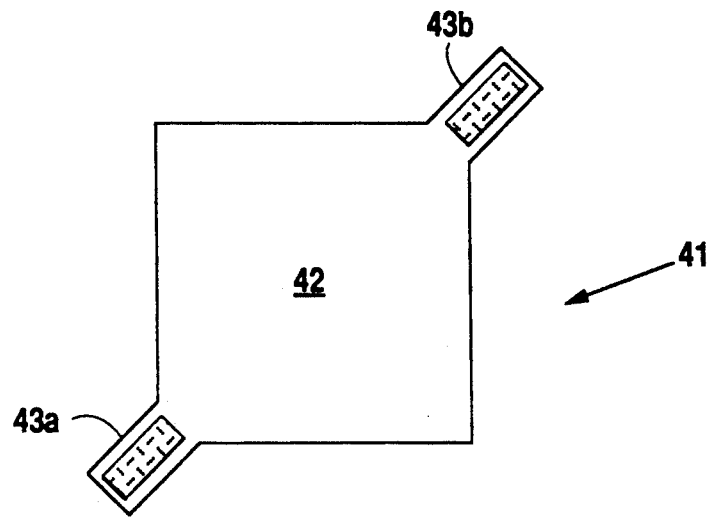
FIGS. 4A and 4B illustrate a pixel element of a DMD.
Figure 4B:
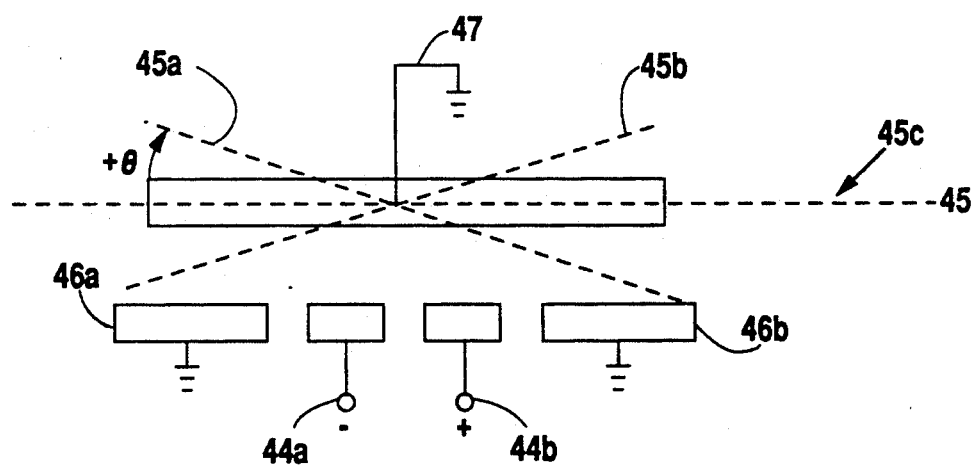

FIGS. 4A and 4B illustrate a movable pixel element 41, such as comprises the pixel arrays of the DMDs used for SLMs 12a–12c and SLM 13. When pixel element 41 is in one position, the light incident on the DMD is redirected toward lens 17 and hence to screen 18. That pixel will be illuminated. When element pixel 41 is in another position, light is not directed to lens 17 and that pixel will be dark.

The pixel element 41 of FIGS. 4A and 4B is of a torsion-beam design, where a thick reflective beam, i.e., mirror 42, is suspended over an air gap and connected between two rigid supports by two thin torsion hinges 43a and 43b that are under tension. When an address electrode 44a or 44b, underlying one-half of mirror 42, is energized, the torsion hinges 43a and 43b are twisted and mirror 42 rotates about the axis of the two hinges 43a and 43b.

The movement of mirror 42 is shown in FIG. 4B. Mirror 42 moves about an axis from the position shown by the dotted line 45a to the position shown by the dotted line 45b relative to the plane surface 45c of mirror 42. In an "on" position, the edge of mirror 42 touches landing electrode 46a. Mirror 42 is moved to the "on" position by applying the proper voltages to address electrodes 44a and 44b. The differential bias is applied to mirror 42 through electrode 47. If an opposite voltage is applied to electrodes 44a and 44b, then mirror 42 will rotate to the position represented by the dotted line 45b and directs the light elsewhere.

The torsion-beam pixel of FIGS. 4A and 4B is only one type of pixel architecture, and many other architectures are possible. These are distinguished by characteristics such as their deformation mode, pixel shape, and the hinge support architecture. However, for purposes of the invention herein, any sort of architecture is satisfactory so long as each pixel element is capable of independent movement.

It should be understood that, in addition to the binary operation described above, a DMD may be operated in an "analog" mode by varying the angle at which it tilts. Various types of phase and amplitude modulation may be achieved in this manner, as described in U.S. patent Ser. No. 590,405, "Spatial Light Modulator with Full Complex Light Modulator Capability". This patent application also describes pixel elements having divided mirror elements. The concepts described therein could be implemented with DMDs 12a–12c or 13.

Referring again to FIG. 1, as an overview of the display system, three light sources 11a–11c generate light energy for ultimate illumination of photosensitive surface 18. Each source 11a–11c provides light of a different primary color, red, green, and blue. Three color-regulating SLMs 12a–12c each receive light from one of the sources 11a–11c, and are used to regulate the intensity of each color. The regulated light of each color is mixed to form a single beam, which is directed to an image-addressing SLM 13 to generate a pixel image. The image is displayed on a photosensitive surface 18. As used herein, the phrase "photosensitive surface" includes surfaces which are reflective or dispersive.

As each pixel is being displayed by addressing SLM 13, its color is adjusted by color regulating SLMs 12a–12b. Thus, in the typical display system, where each pixel is associated with its own color, the two types of SLMs operate at the same speed.

More specifically, light sources 11a–11c may be of conventional form, such as incandescent, halogen, arc, or other known type. In the preferred embodiment, each light source 11a–11c provides a high intensity beam, which together with the persistence of photosensitive surface 18, ensures an image of sufficient brightness to compensate for the fact that illumination of photosensitive surface 18 may be on a pixel-by-pixel basis. Thus, in the preferred embodiment, red source 11a, green source 11b, and blue source 11c each produces a beam of the respectively colored light.

An advantage of the invention, is that in the simplest embodiment, each light source 11a–11c may shine at a constant intensity. However, in other embodiments, the intensity of each source may also be varied.

Color-regulating SLMs 12a–12c receive the red, green, and blue light from light sources 11a–11c. In operation, a predetermined number of pixels are turned on, according to the desired intensity of light of the pixel currently to be displayed. The highest intensity color would require that all pixels be turned on; the absence of color would require that no pixels be on. For varying intensities, the desired intensity is directly proportional to the number of pixels turned on. Each SLM 12a–12c may be relatively simple. For example, a typical color-regulating SLM 12a–12c might be a 256 pixel array, in dimensions of 16×16 pixels. This would provide $2^8$, or 256 different intensity levels.

Combining mirrors 14a and 14b are used to linearize and mix the different colored light after reflection from color-regulating SLMs 12a–12b. A first combining mirror 14a receives light on path "a" from SLM 12a and light on path "b" from SLM 12b. It passes light from path "a" to path "c" and redirects light from path "b" to path "c". A second combining mirror 14b receives the mixed light on path "c" and light on path "d" from SLM 12c. It passes light from path "c" to path "e" and redirects light from path "d" to path "e". Because mirrors 14a and 14b may not transmit all light, the intensity of light at each source may need adjustment so that the proper proportions exist on path "e".

A beam expansion lens 15 expands the light from path "e" into a beam of larger diameter. Fold mirror 16 reflects this light to addressing SLM 13.

Addressing SLM 13 is addressed via control signals, on a pixel-by-pixel basis, using known addressing techniques for SLMs. An image frame for display on photosensitive surface 18 is comprised of light from the entire array of pixels elements of addressing SLM 13. As compared to color-regulating SLMs 12a–12c, addressing SLM 13 has a large number of pixel elements, depending on the desired pixel resolution. As an example, a 640×480 pixel DMD used for SLM 13 would provide high resolution by today's standards.

In operation, if the control signals received by SLM 13 have applied voltage representing an "on" state to a pixel element, it will rotate in a given direction. Otherwise, it will not rotate in that direction. If the pixel element, is "on", light from fold mirror 16 is reflected to projection lens 17, which projects the light to photosensitive surface 18.

Thus, as each pixel element for an image frame is addressed, data representing its color, expressed in terms of varying intensities of each of the three primary colors is translated by computer 19 into control signals for each color-regulating SLM 12a–12c. Using the example of 256 pixel DMDs, each DMD receives "on" signals for any one of $2^8$ levels of intensity of each color. The light reflected from DMDs 12a–12c is mixed and directed to SLM 13, via mirrors and lenses as explained above. The mixed light is reflected by the addressed pixel of SLM 13 to photosensitive surface 18.

Photosensitive surface 18 may be a light-sensitive array of phosphor pixels, with each pixel having one phosphor for each of the three primary colors. Because SLM 13 operates on a pixel-by-pixel basis, persistence of the phosphors, as well as the speed of SLM 13 and intensity from light sources 11a–11c, should be sufficient to provide a coherent image. In the preferred embodiment, photosensitive surface 18 is comprised of materials known in the art, such as uranyl ions, lanthanum ions, erbium ions, organic daylight fluorescent pigments, etc, which exhibit optical fluorescence when excited by light, including excitation light of the same wavelength at which the phosphor fluoresces. However, if speed is sufficient, photosensitive surface 18 might be reflective instead of phosphor-based.

Typically, photosensitive surface 18 is used in a back projection mode. Optionally, a coating on screen 18 may reflect the light in front projection mode. In either case, the fluorescing material should have a decay time that is sufficient, in view of the time required to display a complete frame of pixels and the intensity of light sources 11a–11c, to provide a complete image.

The control and timing signals for SLMs 12a–12c and SLM 13 may come from processor 25. Alternatively, a control unit 19b, having its own timing devices, may be used to control the specific operation of these SLMs. In either case, control bus 19a is used to carry control signals and data to the SLMs.

As an alternative to the single linearized mixed beam along path "e", the three beams of light from color-regulating SLMs 12a–12c could be linearized along three different paths. In this case, there would be several sets of combining mirrors 14a and 14b and focussing lens 15. Then, multiple addressing SLMs 13 could receive different colors of color-regulated light, and could be used to further modulate the light, e.g., adjust the intensity on a pixel-by-pixel basis. The light would then be combined and directed to photosensitive surface 18.

Figure 5:
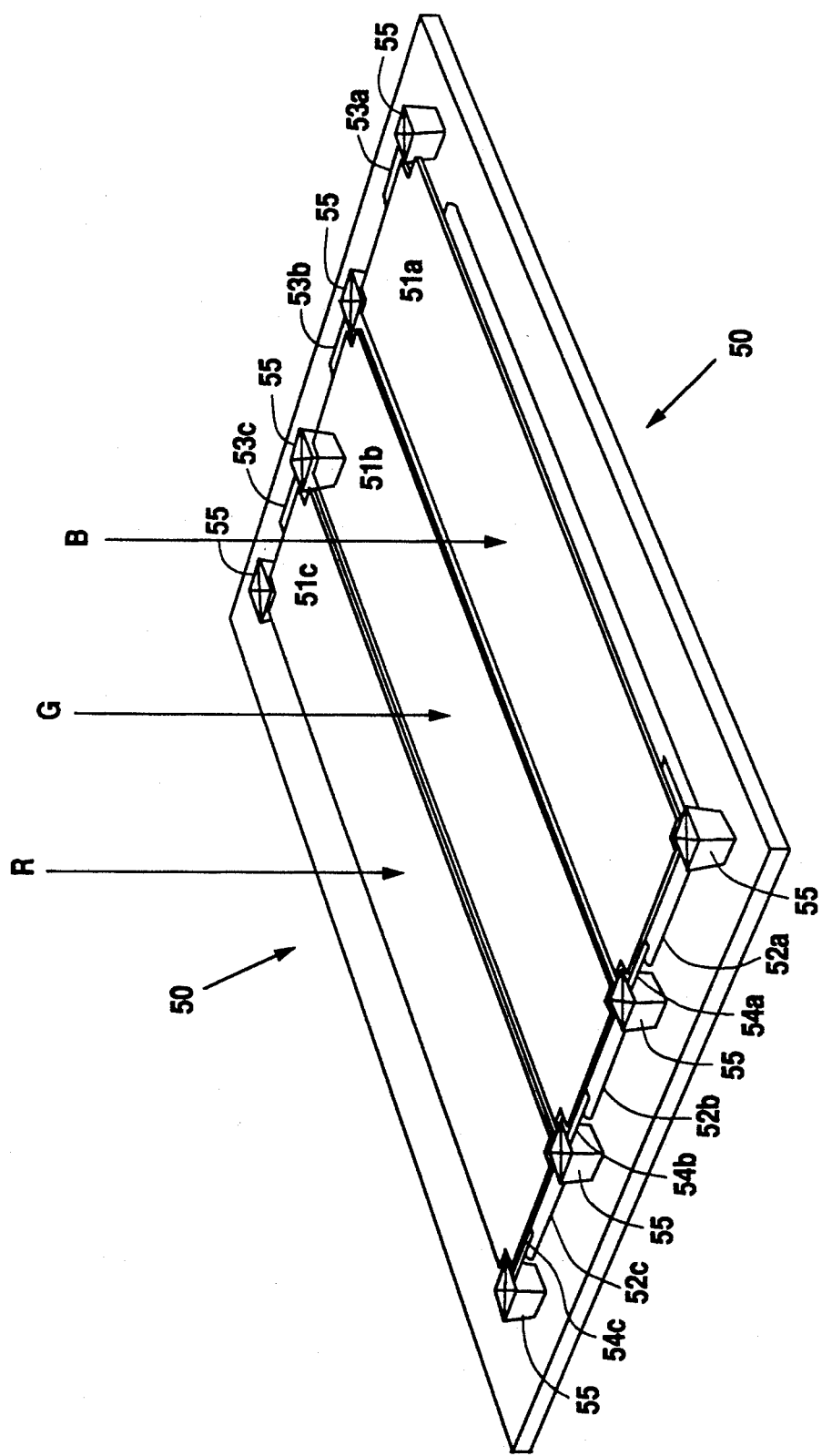
FIG. 5 illustrates an enhancement of the invention using a DMD having divided pixel elements.

FIG. 5 illustrates this concept of further modulating the color-regulated light with the addressing SLM 13.

In FIG. 5, light from each source 11a–11c is directed along a separate path to a single pixel element 50 of a DMD having divided mirror parts. Such a DMD is described in U.S. Ser. No. 590,405, "Spatial Light Modulator with Full Complex Light Modulation Capability". Appropriate mirrors and lenses would be used to direct light from each source 11a–11c to a mirror part 51a–51c of each pixel element 50. An advantage of this embodiment is that each color of light incident on SLM 13 could be separately modulated by SLM 13. If a voltage is applied to address electrode 52a, then mirror 51a will deflect downward, flexing on hinges 53a and 54a. Mirror sections 51b and 51c will not deflect unless a voltage is applied to their address electrodes 52b and 52c, which allows independent operation of the three mirror sections 51a–51c. Flexure hinges 53a–53c and 54a–54c are supported by support posts 55, creating a gap between mirror elements 51a–51c and their electrodes 52a–52c, respectively.

Optics unit 10 can be used with just SLMs 12a–12c (without addressing SLM 13) to produce light of virtually any color and intensity for a wide variety of applications. An example of one such application is stage lighting.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A color display system for displaying an image from an incoming data signal comprised of data representing the image in terms of pixels, where each pixel has color data representing an intensity of each of three primary colors, comprising:
   a set of light sources, one for each primary color;
   a set of color-regulating spatial light modulators (SLMs), wherein each of said color-regulating SLMs receives light from only one of said light sources, and wherein each of said color-regulating SLMs comprises an array of pixel elements, each pixel element comprising:
   a reflective, active area;
   addressing circuitry arrange such that each element is individually addressable, and when addressed with an on signal, the element reflects light in a specified direction;
   a means for linearizing light, arranged in said specified direction so as to receive light from said color-regulating SLMs toward an addressing SLM; and
   an addressing SLM, wherein said SLM comprises an array of pixel elements with addressing circuitry arranged so that each element is individually addressable, for receiving said linearized light beam and for reflecting said beam to a photosensitive surface.

2. The system of claim 1, wherein said linearizing means combines light from each of said color-regulating SLMs such that a single mixed light beam is produced.

3. The system of claim 1, wherein said linearizing means directs light along a path for each color and wherein a number of addressing SLMs each receive light from one of said paths.

4. The system of claim 1, wherein said color-regulating SLMs are deformable mirror devices.

5. The system of claim 1, and further comprising control means for loading said color-regulating SLMs in accordance with said incoming data.

6. The system of claim 1, further comprising timing means coupled to said addressing circuitry of said addressing SLM so that as each pixel of said addressing SLM is addressed, its color is adjusted by said color-regulating SLMs.

7. The system of claim 1, wherein said photosensitive surface is a display screen.

8. The system of claim 1, and further comprising at least one additional set of light sources and color-regulating SLMs.

9. The system of claim 1, wherein said photosensitive surface is photosensitive film.

10. The system of claim 1, wherein each of said pixel elements of said addressing SLM is divided into individually addressable pixel sections, each for receiving a single color of light from said color-regulating SLMs.

11. A method for forming a color image from an incoming signal comprised of data representing the image in terms of pixels, wherein each pixel has color data representing an intensity of each of several different colors, comprising the steps of:
   addressing a pixel element of an addressing spatial light modulator (SLM), wherein said element has addressing circuitry which actuates said cell, such that only said addressed pixel element can reflect light in predetermined path;
   generating a number of beams of light, each of a different color;
   receiving each of said beams of light at an associated color-regulating SLM;
   adjusting the number of pixel elements of said color-regulating SLM that will reflect said light along said predetermined path;
   linearizing light reflected from each of said color-regulating SLMs on a path toward said addressing SLM;
   receiving said linearized light at said addressing SLM;
   receiving light reflected from said addressing SLM on a photosensitive surface; and
   repeating the above steps for a next pixel element until a complete image frame is generated on said photosensitive surface.

12. The method of claim 11, and further comprising the step of linearizing light reflected from each of said color-regulating SLMs along a predetermined path to form a single mixed color light beam.

13. The method of claim 11, and further comprising the step of receiving light reflected from said addressing SLM on a photosensitive surface is accomplished with a display screen.

14. The method of claim 11, and further comprising the step of timing said steps such that they occur in real time with said incoming signal.

15. The method of claim 11, wherein said adjusting step is achieved by loading more than one part of said color-regulating SLM simultaneously.

16. The method of claim 11, wherein more than one pixel element of said addressing SLM is addressed at one time, and said steps are duplicated for each of said simultaneously addressed pixels.

17. The method of claim 11, and further comprising the step of receiving light reflected from said addressing SLM on a photosensitive film for recording a still picture.

18. The method of claim 11, and further comprising the step of receiving light reflected from said addressing SLM at a photosensitive sensor that generates an electronic signal.

19. A color display system for displaying an image from an incoming data signal comprised of data representing the image in terms of pixels, where each pixel has color data representing an intensity of each of three primary colors, comprising:

a processor for transforming said incoming data;

a frame buffer for receiving and storing said data on a frame by frame basis;

an optics unit having a set of light sources, one for each primary color, a set of color-regulating spatial light modulators (SLMs), wherein each of said color-regulating SLMs receives light from one of said light sources, and wherein each of said color-regulating SLMs comprises an array of pixel elements that may all be switched on or off simultaneously, a means for linearizing light from said color-regulating SLMs toward an addressing SLM, and an addressing SLM for receiving said linearized light beam and for reflecting said beam, wherein said addressing SLM comprises an array of individually addressable pixel elements; and a photosensitive surface for receiving light reflected from said addressing SLM.

20. The system of claim 19, wherein said processor has timing means for controlling said color-regulating SLMs and said addressing SLM such that said image is received at said photosensitive surface in real time relative to said incoming signal.

21. The system of claim 19, wherein said color-regulating SLMs are deformable mirror devices.

* * * * *